March 29, 1960 H. L. BOWDITCH 2,930,231
FLOW MEASURING APPARATUS
Filed May 4 1955 3 Sheets-Sheet 1
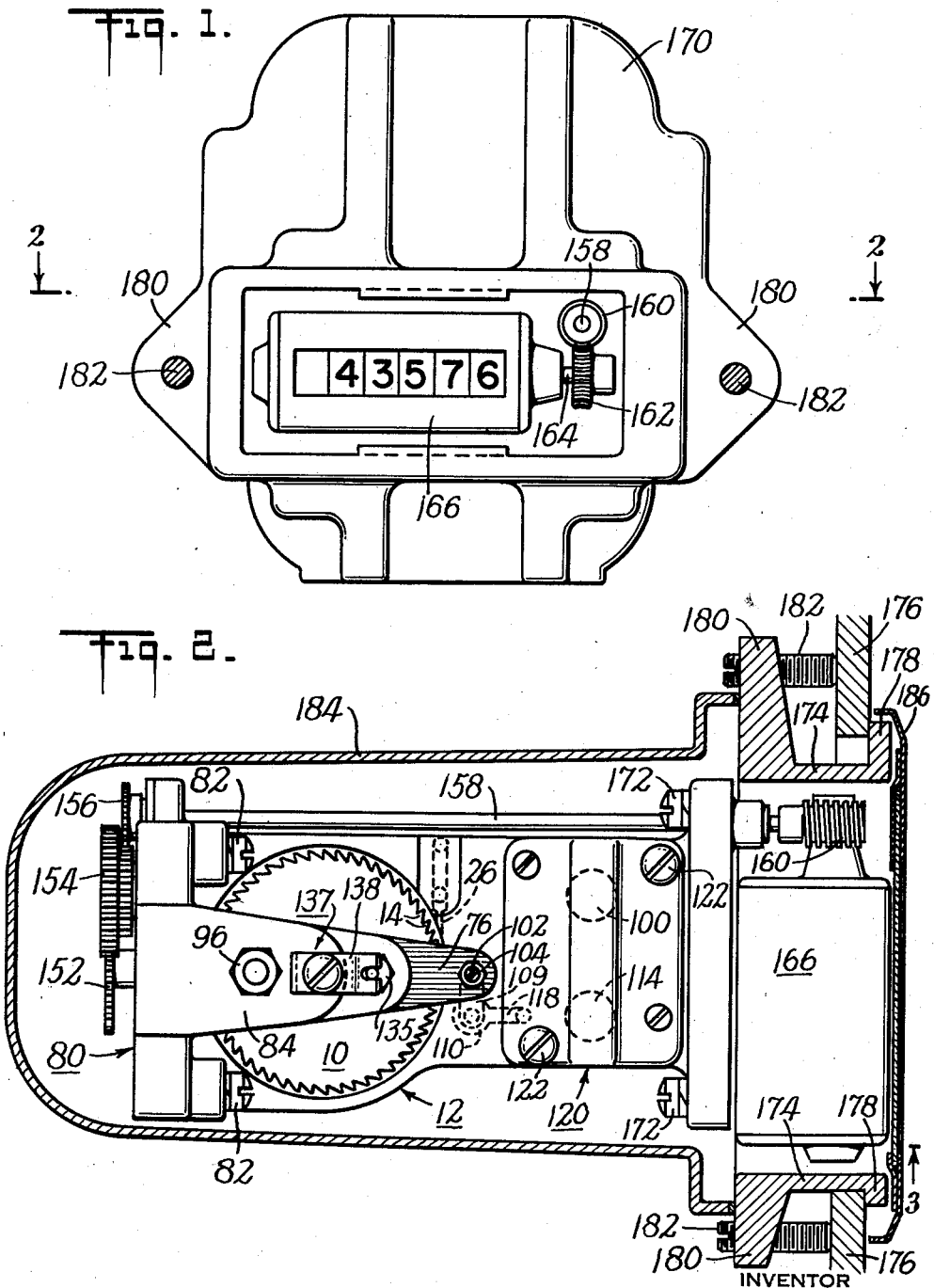
INVENTOR
Hoel L. Bowditch
BY
Curtis Morris & Safford
ATTORNEYS March 29, 1960  H. L. BOWDITCH  2,930,231
FLOW MEASURING APPARATUS
Filed May 4 1955  3 Sheets-Sheet 2

INVENTOR
Hoel L. Bowditch
BY
Curtis Morris & Safford
ATTORNEYS

March 29, 1960

H. L. BOWDITCH 2,930,231

FLOW MEASURING APPARATUS

Filed May 4 1955

INVENTOR
Hoel L. Bowditch
BY
Curtis, Morris & Safford
ATTORNEYS

United States Patent Office

2,930,231
Patented Mar. 29, 1960

2,930,231

FLOW MEASURING APPARATUS

Hoel L. Bowditch, Foxboro, Mass., assignor to The Foxboro Company, Foxboro, Mass., a corporation of Massachusetts Application May 4, 1955, Serial No. 505,878

12 Claims. (Cl. 73—206)

This invention relates to apparatus for measuring fluid flow rates. More particularly, this invention relates to apparatus useful in providing a continuously integrated measure of total fluid flow.

One of the most common methods of determining the flow rate of a fluid, e.g. liquid flowing through a pipe, is to insert an obstruction such as an orifice plate in the flow stream and measure the pressure differential between the upstream and downstream sides of the obstruction. As is well known, the magnitude of this pressure differential is related to the flow rate of the fluid by a "square-law" function, i.e. the measured differential pressure may, for most practical purposes, be considered to be directly proportional to the square of the fluid velocity.

This square-law relationship creates certain problems, particularly where it is desired to record the fluid flow rate or to compute the total amount of flow that has taken place over a given period of time. For example, if a standard recording instrument having a linear pen movement is used to produce a record of flow rate over a period of time, the display chart normally is provided with a "square-law" scale to obtain a correspondence between the chart units and the actual rate of flow. The graduation markings on such a chart are, of course, compressed in a region near one end of the scale, and the resulting decrease in reading accuracy in that scale region places an artificial limitation on the instrument's usefulness. Also, when it is desired to measure total volume of flow over a period of time, special arrangements generally must be provided to compensate for this square-law relationship to assure reasonably accurate results.

Various attempts have been made to solve this probleb, as by means of intricate linkage mechanisms which are arranged to convert the differential-pressure signal into a physical movement that is directly proportional to flow rate. Such mechanisms may be used to drive a recording pen, thus permitting the use of a linear-scale chart, or may be employed in conjunction with an integrating device to obtain a record of total flow. However, none of these prior attempts has fully solved the problem with the requisite simplicity or precision.

Furthermore, the flow integrating devices provided heretofore have not been completely satisfactory in certain respects. For example, many such devices are arranged to sample the flow rate periodically to obtain a measure of total flow, and hence are subject to inaccuracies particularly where the flow rates are changing rapidly. Also, many of such prior devices have been unduly complex and expensive to manufacture.

The present invention contemplates an improved solution to these and related problems. In a preferred embodiment of this invention, to be described hereinbelow in more detail, the pneumatic pressure output signal developed by the usual differential-pressure flow-sensing device is fed to a bellows which applies a force, corresponding in magnitude to this signal, to one side of an elongated bar pivotally supported at one end thereof. The resulting signal torque on this bar is continuously countered by an oppositely-directed feedback torque, the magnitude of which is arranged to be directly proportional to the centrifugal force produced by a rotating flyball. This flyball is pivotally supported on a turbine wheel, the rotational velocity of which is controlled automatically in such a manner that the feedback torque produced by the flyball tends to maintain the elongated bar in balance with a net torque of zero. The automatic control of the turbine-wheel speed is accomplished by means of a flapper-nozzle arrangement, associated with the pivoted bar, which appropriately varies the velocity of a stream of air used to drive the turbine.

In operation, when for example the pneumatic pressure signal increases due to an increased rate-of-flow of the fluid being measured, the resulting change in signal torque on the elongated bar will produce an immediate slight change in the position of this bar about its pivot point, and this in turn will, due to the associated nozzle-flapper arrangement, cause the stream of air fed to the turbine wheel to be increased. The turbine wheel accordingly will speed up to cause the flyball to generate increased centrifugal force, and this force is applied, through a linkage arrangement, to the bar in opposition to the force applied by the bellows. The turbine wheel will continue to speed up until the opposing torques on the bar are exactly in balance, at which time the bar will be stabilized in a new position with respect to the associated nozzle.

Since the centrifugal force generated by a rotating flyball is proportional to the square of its velocity of rotation, the speed of the turbine wheel will, when the bar is in balance, be directly proportional to the flow rate of the fluid under measurement. In the present embodiment, the rotating shaft of the turbine wheel is mechanically coupled to a counter device, which is arranged to indicate in the usual way the total number of revolutions of this shaft and, correspondingly, the total volume of fluid flow over a given period of time.

Accordingly, it is an object of this invention to provide flow measuring apparatus that is superior to such apparatus used heretofore. It is a further object of this invention to provide apparatus arranged to produce a measurement signal the magnitude of which is directly proportional to flow velocity. It is a still further object of this invention to provide improved apparatus adapted to integrate, continuously and accurately, the measured rate of fluid flow to produce a positive indication of total volumetric flow for a given period of time. Other objects, advantages and aspects of the present invention will be in part pointed out in, and in part apparent from, the following description considered together with the accompanying drawings, in which:

Figure 1 is a front elevation view of a preferred embodiment of the present invention;

Figure 2 is a horizontal section taken along line 2—2 of Figure 1;

Figure 3:
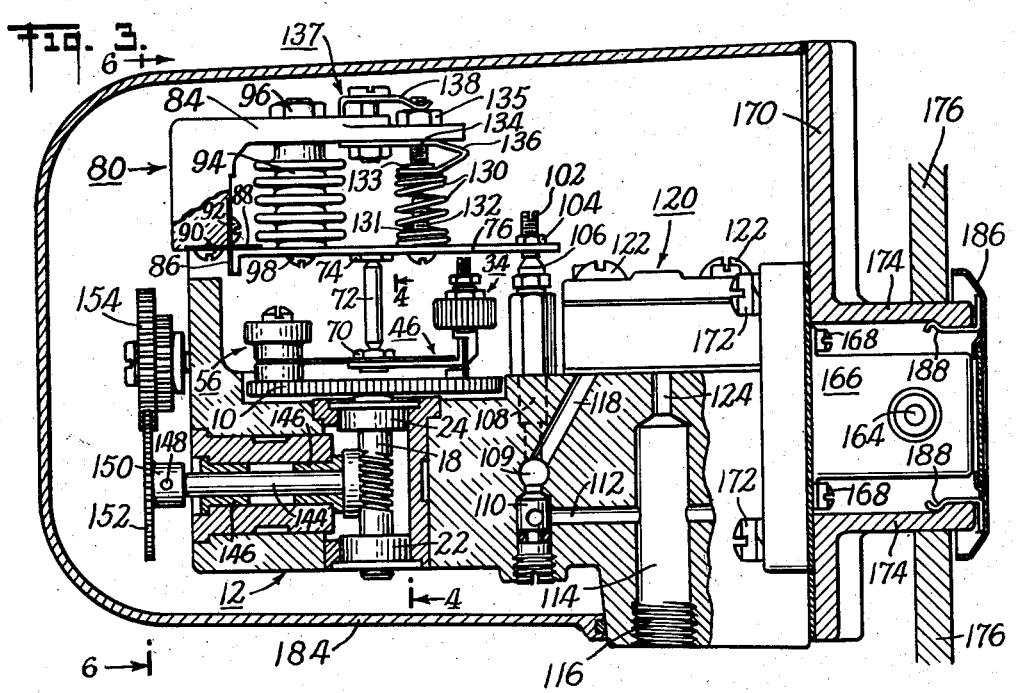
Figure 3 is a longitudinal vertical section taken along line 3—3 of Figure 2.
Figure 4:
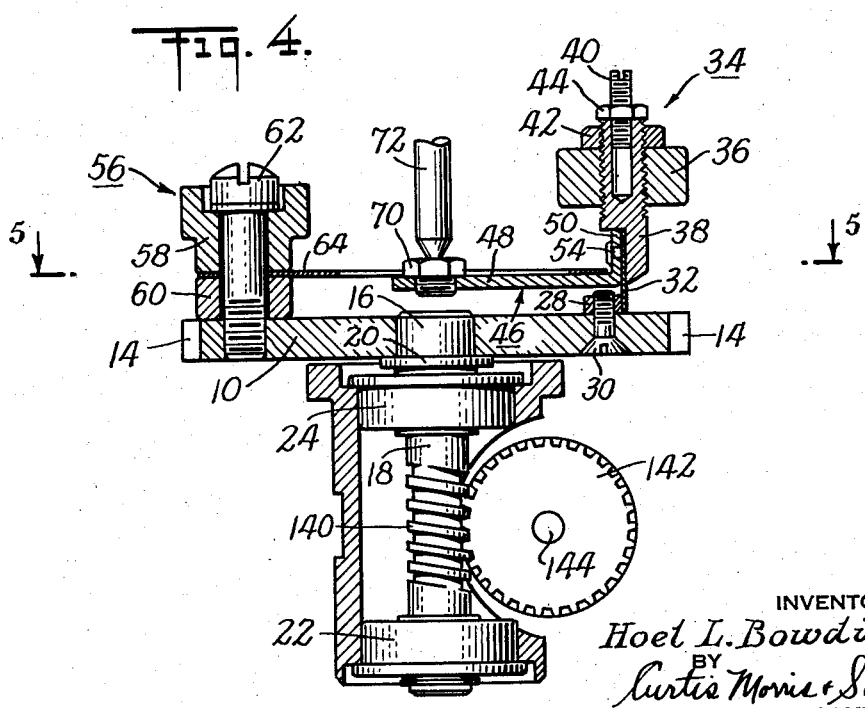
Figure 4 is a vertical detail cross-section taken along line 4—4 of Figure 3 (with the turbine wheel rotated 90 degrees)

Referring first to Figures 2, 3 and 4, a support member comprising a turbine wheel 10 is shown mounted in a horizontal position on an instrument block generally indicated at 12. This turbine wheel may be of any suitable design, and preferably includes a relatively large number of evenly spaced-apart, saw-tooth shaped teeth 14 on its periphery. The turbine wheel 10 is formed with a centrally-located bore into which extends the upper end 16 of a vertical shaft 18. This shaft is firmly secured to the turbine wheel, as for example by means of a press fit, and is provided with a flange 20 to assure adequate structural support for the wheel. The lower end of the shaft 18 is rotatably supported by a thrust bearing 22; a side bearing 24 also is provided adjacent the upper end of the shaft. Both of these bearings 22 and 24 are of the ball-bearing type, and are securely positioned within the confines of a vertical passage formed in the instrument block 12.

Figure 5:
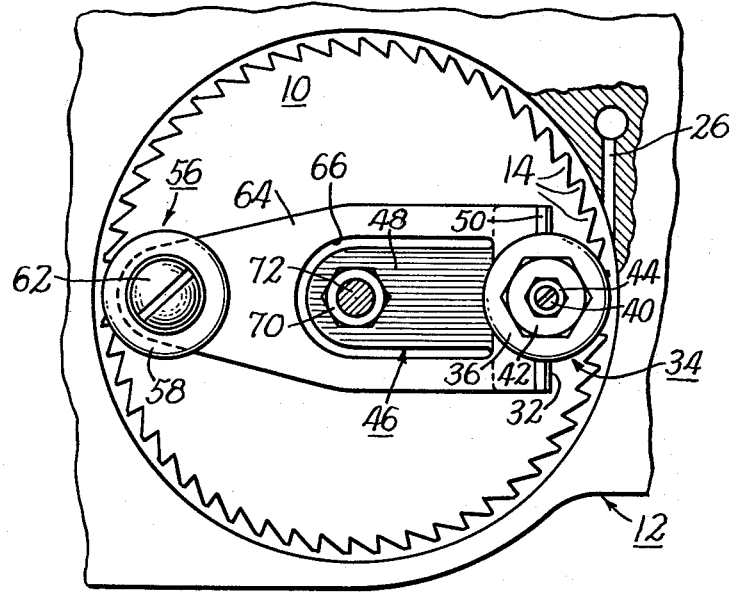
Figure 5 is a horizontal detail section taken along line 5—5 of Figure 4.

The turbine wheel 10 is rotated by power drive means comprising a turbine nozzle 26 (see Figure 5), which directs a stream of air under pressure against the teeth 14 in such a manner as to impart a rotary motion to the wheel about the shaft 18. The velocity of the air stream passing out of this turbine nozzle is controlled, as explained hereinbelow, in such a manner that the rotational speed of the turbine is directly proportional to the rate-of-flow of the fluid under measurement.

Referring now particularly to Figure 4, a small support block 28 is secured to the upper surface of the turbine wheel 10 near the right-hand edge thereof (as shown in the drawing), by means of a bolt 30. Fastened, as by spot-welding, to the right-hand face of this support block 28 is a vertical flexure strip 32 which carries a flyball assembly generally indicated at 34. This flyball assembly includes a relatively heavy cylindrical member 36 threadedly engaged, to permit vertical adjustment of the flyball weight, to an upstanding spindle 38 having a lower notched portion which is fastened to the flexure strip 32. This spindle also is internally threaded to receive a bolt 40 which provides a fine adjustment of the vertical location of the flyball weight. Lock nuts 42 and 44 are provided to hold the cylindrical weight member 36 and the bolt 40, respectively, firmly in their selected positions.

Integral with the flyball assembly 34 is a bell crank generally indicated at 46, the lower horizontal arm 48 of which extends toward and over the center of the turbine wheel 10. This bell crank is generally L-shaped in cross-section, and its upstanding arm 50 is securely fastened to the vertical flexure 32 as by means of spot-welding or small bolts. In addition, a pin 54 extends through the arm 50, the flexure strip 32 and the notched portion of the spindle 38 to assure that these elements are structurally integral.

Also secured to the upper surface of the turbine wheel 10, in a position diametrically opposite to that of the flyball assembly 34, is a counter-weight generally indicated at 56 and comprising upper and lower portions 58 and 60, respectively. This counter-weight is secured to the upper side of the turbine wheel 10 by a large bolt 62 extending downwardly through both portions 58 and 60 and threadedly engaged at its lower end with the wheel. Fastened between the upper and lower portions 58 and 60, and held tightly therebetween, is a horizontal flexure strip 64 (see also Figure 5). This flexure strip extends across the center of the turbine wheel 10 and is secured to the upper face of the horizontal bell crank arm 48, adjacent the upstanding arm 50 thereof, by means of spot-welding. This flexure strip is formed with a cut-out portion 66 to permit the inner end of the bell crank arm 48 to move vertically therethrough.

It will be apparent from the above that the flyball assembly 34 is effectively supported by two mutually-perpendicular flexure strips 32 and 64 (commonly referred to as "cross-fixtures"), so that movement of this assembly is restricted to pivotal motion about the apparent axis of the cross-flexures. Thus, as the turbine wheel 10 speeds up, the flyball assembly will tend to rock about these cross-flexures away from the center of the wheel, in a direction that is generally parallel to a radius of the wheel, and thus the bell crank arm 48 will tend to move upwardly through the opening 66 in the horizontal flexure strip 64. When the turbine wheel slows down, the arm 48 will tend to move downwardly with respect to this opening 66, due to the spring-return force developed by the cross-flexures.

Secured to the upper face of the arm 48, at its inner end, is a jeweled bearing 70 in which is seated the lower tip of a vertical force pin 72 formed of tungsten-carbide. The tip of this pin is concentric with the shaft 18 on which the turbine wheel 10 is rotatably supported, so that no lateral movement is given to the pin as the wheel revolves. The upper tip of this force pin 72 is seated (see Figure 3) in a second jeweled bearing 74 secured to the underside of an elongated, rigid bar 76, at the approximate longitudinal center thereof. Both bearings 70 and 74 may, for example, include a sapphire ring jewel mounted on a sapphire retaining plate. With this dual bearing arrangement, the force pin 72 is subjected to very little rotational friction, and is free to rotate with respect to either the arm 48 or the force bar 76, or both.

Attached to the upper left-hand corner (referring to Figure 3), of the instrument block 12, is an overhanging arm, generally indicated at 80, which is approximately L-shaped in cross-section. This arm is held in place by two bolts 82 (see Figure 2). The horizontal portion 84 of this arm extends out over and slightly beyond the center of the turbine wheel 10 and serves to support certain operating elements to be described. The force bar 76 is mounted for essentially frictionless pivotal movement about the lower left-hand end of this overhanging arm 80, by means of a cross-flexure arrangement including two mutually-perpendicular flexure strips 86 and 88 which are fastened to the arm 80 by bolts 90 and 92 and to the left-hand end of the force bar 76 by spot-welding.

A signal bellows 94 is positioned between the horizontal arm portion 84 and the force bar 76. The upper part (as shown in the drawing) of this bellows is formed into a cylindrical neck which extends through the arm portion 84 and is held in place by a nut 96. The lower face of the bellows is fastened to the force bar 76 by means of a bolt 98.

The interior of the signal bellows 94 communicates, through a conduit (not shown) connected in the usual way to the neck of the bellows, with a vertical signal input chamber 100 formed in the instrument block 12 (see Figure 2). This signal chamber 100 extends down to an opening in the lower surface of the instrument block 12, and is there provided with a suitable fitting for connection to the output of the usual flow-sensing device (not shown herein, as for example of the type shown in applicant's Patent 2,806,480 issued on September 17, 1957) employed to develop a differential-pressure signal in accordance with the rate-of-flow of the fluid under measurement. Accordingly, the bellows 94 applies a pressure to the force bar 76 which produces a torque thereon, about the cross-flexure mounting 86 and 88, proportional in magnitude to the square of the fluid flow rate.

Threadedly engaged with the right-hand end (referring again to Figure 3) of the force bar 76 is a small bolt 102 which is locked in position by a nut 104. The lower flat face of this bolt is closely adjacent the mouth of a control nozzle 106 which is supplied with air under pressure. As the force bar is rotated about its cross-flexure pivot axis, this bolt moves with respect to the nozzle mouth and serves as a flapper to vary in a precise manner the degree of restriction placed on the flow of air through the nozzle.

This nozzle 106 is of conventional construction and is mounted by suitable fittings on the upper surface of the instrument block 12. The interior of this nozzle communicates, through a vertical passageway 108 and a horizontal passageway 109 in the block 12, through a flow restrictor 110, and through a second horizontal passageway 112 to an air supply chamber 114. This chamber is adjacent the signal input chamber 100, referred to hereinabove, and extends down to another opening in the lower surface of the instrument block where a fitting 116 is provided to connect the supply chamber to a source (not shown) of air under pressure, e.g. 20 p.s.i.

The rate of air flow through the restrictor 110 from the supply chamber 114, and, correspondingly, the pressure drop across this restrictor, will be determined by how close the bolt 102, carried by the force bar 76, is to the mouth of the control nozzle 106. For example, as the force bar rotates clockwise (referring to Figure 3), the lower face of this bolt will move towards the control nozzle and will tend to decrease the flow of air therethrough. Thus, as the rate of air flow through the restrictor 110 correspondingly decreases, the pressure drop across this restrictor 110 will also decrease. Consequently, since the pressure in the supply chamber 114 is constant, the air pressure in the passageways 108 and 109 will be precisely controlled by the positioning of the force bar 76.

The horizontal passageway 109 also communicates, through an inclined passageway 118 (as shown in Figure 3) in the instrument block 12, with the input chamber of a pneumatic relay, generally indicated at 120, which is secured to the upper surface of the instrument block by bolts 122. This relay may be of any standard type having suitable response characteristics, and preferably is similar to that referred to in U.S. patent application Serial No. 357,059 filed by Graydon Smith on May 25, 1953, now U.S. Patent No. 2,736,629, issued on February 28, 1956. The relay is supplied with air under pressure through a small vertical passageway 124 communicating with the supply chamber 114, and provides an output air pressure signal, proportional in magnitude to the pressure in the interior of the nozzle 106, which is transmitted to the turbine nozzle 26 through further passages (not shown) in the instrument block 12. Thus, the velocity of the air stream striking the teeth 14 of the turbine wheel 10 is precisely controlled by the positioning of the force bar 76 with respect to the control nozzle 106.

Returning now to the force bar 76, it will be apparent from the above that this bar is subjected to opposing torques due, respectively, to the forces exerted thereon by the signal bellows 94 and the force pin 72. When the rate-of-flow of the fluid under measurement is unchanging, the force bar 76 will remain in a stationary position with respect to the control nozzle 106. This position will be such as to cause the turbine wheel 10 to rotate at a speed which develops an upwardly-directed force, transmitted by the force pin 72, of the correct magnitude to produce a net torque of zero on the force bar.

When, for example, there is an increase in the rate-of-flow of the fluid under measurement, the differential-pressure signal fed to the bellows 94 through the input passage 100 will correspondingly increase an amount proportional to the square of the increase in fluid flow rate. The bellows will therefore apply a greater pressure to the force bar 76, and this bar will rotate a slight amount clockwise about its pivot axis since the torques on this bar are momentarily unbalanced. Accordingly, the free end of the force bar will move closer to the mouth of the control nozzle 106 and impose a greater restriction on the flow of air through that nozzle from the supply chamber 114. As explained above, this decrease in air flow will produce an increase in the pressure within the nozzle 106 and the passages 108, 109 and 118. This increased air pressure is transmitted to the input chamber of the pneumatic relay 120 which correspondingly increases the pressure of the pneumatic output signal fed to the turbine nozzle 26.

The resulting increased velocity of air passing through the turbine nozzle 26 causes the turbine wheel 10 to accelerate, and the flyball assembly 34 carried by this wheel accordingly will be subjected to increased centrifugal force. Hence, this flyball assembly will tend to move outwardly away from the center of the turbine wheel, and so will rock about its pivotal cross-flexure mounting. This rocking movement is transmitted through the bell crank 46 to the force pin 72, which applies an increased upwardly-directed force to the force bar 76. The turbine wheel will continue to speed up until the increased counter-torque applied to the force bar 76 by the force pin 72 exactly equals the additional torque originally produced by the bellows 94 in response to the increase in the differential-pressure signal fed thereto, at which time the force bar 76 will, of course, again be stationary, but in a slightly different position.

Since, as is well known, the centrifugal force generated by the rotating flyball assembly 34 is proportional to the square of the rotational velocity of the turbine wheel 10, the change in speed of the turbine wheel needed to exactly counterbalance the added torque (due to the increased rate of fluid flow) on the force bar 76 will be proportional to the square-root of the change of pressure in the bellows 94. Consequently, since the change in the flow rate of the fluid under measurement also is proportional to the square-root of the change of pressure in the bellows 94, the net change in speed of the turbine wheel 10 needed to return the force bar 76 to a balanced condition will be directly proportional to the change in flow rate of the fluid under measurement.

Therefore, it will be apparent that the described apparatus, when employed with the usual differential-pressure flow-sensing device, is adapted to provide a continuous signal (i.e. speed of rotation of the turbine wheel shaft 18) that is directly proportional to the actual flow rate of the fluid being measured. For ready observation or recording of this signal, the turbine shaft may, for example, be mechanically coupled to a tachometer (not shown) or a similar device which produces a direct indication of rotational velocity. Furthermore, this true measure of flow rate is remarkably accurate even during periods of rapid fluctuation of fluid flow. One of the reasons for this is that the rotational inertia of the turbine wheel 10 is relatively small, and hence this wheel may be accelerated or decelerated to a new speed in a negligibly small time. And this is especially true because of the low time lag and relatively high power capacity of the pneumatic drive system which operates continuously to maintain the wheel rotating at the correct speed.

Since the pneumatic differential-pressure signal produced by a conventional flow-sensing device typically has a value other than zero (e.g. 3 p.s.i.) for the zero fluid flow rate condition, means also are provided to furnish a bias torque to the force bar 76 to balance out this zero flow rate signal. Referring again to Figure 3, this "zero set" arrangement includes a coil spring 130 positioned between the force bar 76 and the overhanging arm 84. This spring is maintained in tension, and is held at its lower end by a nut 131 threaded onto a bolt 132 extending upwardly through the force bar. The upper end of this spring 130 is held by another nut 133 secured to a second bolt 134 extending downwardly through the arm 84, and having a hexagonal head 135 in pressure engagement with the top surface of this arm 84.

With this arrangement, the coil spring 130 exerts an upward force on the force bar 76, and thus produces a torque, on this bar, in opposition to the torque produced by the signal bellows 94. To adjust the instrument for zero flow rate condition, the hexagonal head 135 is rotated, and this in turn varies the tensioning of the spring 130 by causing the upper nut 133 to move up or down with respect to the horizontal arm 84. The proper adjustment is achieved when the torque produced by the spring 130 on the force bar 76 is equal to the torque on this bar produced by the bellows 94 when the latter is subjected to a pressure signal indicating zero rate of flow of the fluid being measured.

To prevent the spring 130 from rotating with the hexagonal head 135 during such an adjustment, the upper nut 133 is fastened to a small leaf spring 136 which is secured at its other end to the underside of the horizontal arm 84, by means of a nut and bolt arrangement generally indicated at 137. Also, to prevent the hexagonal head 135 from rotating after the adjustment has been properly made, e.g. due to vibration, etc., the upper surface of this head is engaged by the two forked ends of a bent leaf spring 138 which also is secured to the arm 84 by the nut and bolt arrangement 137. It may additionally be noted that, when signal pressure has been cut off from the signal bellows 94, upward motion of the force bar 76 is restricted by contact of the opposing ends of the two bolts 132 and 134, so that the force pin 72 is not permitted to escape from its upper bearing 74 when the instrument is shut down.

Figure 6:
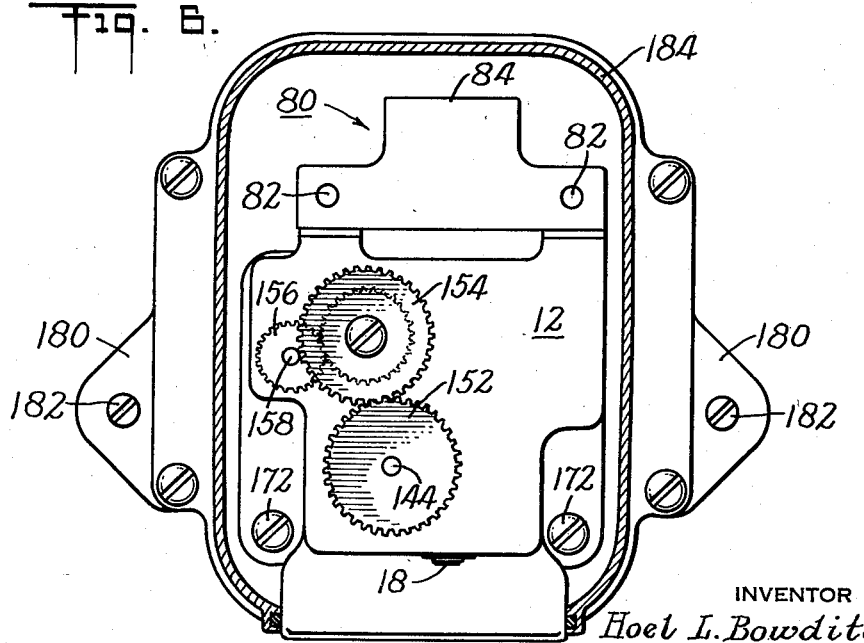
Figure 6 is a section view taken along line 6—6 of Figure 3.

Turning now to the integration aspects of the present invention, to provide a direct indication of total volumetric flow, the turbine shaft 18 is coupled, in a manner to be explained below, to a counter mechanism which displays continuously the number of shaft revolutions. For this purpose, referring now to Figure 4, the central portion of the turbine shaft 18 is formed with a worm thread 140 which is engaged by the teeth of a worm gear 142 secured to a horizontal shaft 144. As shown in Figure 3, this shaft 144 extends through suitable bearings 146 secured within the instrument block 12, and at its remote end is fastened, by means of a pin 148, to the hub 150 of a pinion 152 (see also Figure 6). This pinion 152 drives a set of change gears including an intermediate gear 154 and a second pinion 156. This latter pinion 156 is, in turn, mounted on a horizontal shaft 158 which (referring now to Figure 2) extends the full length of the instrument and at its remote end drives a worm 160. This worm engages a worm gear 162 (see Figure 1) mounted on the input shaft 164 of a conventional counter mechanism 166 secured to the front end of the instrument block 12 by means of small bolts 168 (see Figure 3).

With this arrangement, the counter 166 is adapted to provide a numerical front-panel indication (as shown in Figure 1) that is exactly proportional to the number of revolutions made by the turbine wheel 10 over a given period of time. Since the velocity of rotation of the turbine wheel is, as explained above, directly proportional to the flow rate of the fluid under measurement, the counter 166 thus provides a totalized measure of the volumetric flow for a given period of time.

For ready adaptability to industrial installations, this instrument also includes provisions for mounting on the usual display panel. Referring again to Figure 3, the instrument block 12 is secured at its right-hand end to a mounting plate 170, by means of bolts 172. This plate 170 is formed with forward projecting walls 174 which define a rectangular space in which the counter 166 is located. These walls are adapted to extend through a corresponding opening in a panel 176 and, as shown in Figure 2, the two side walls are provided at their forward ends with flanges 178 arranged to bear against the front surface of the panel 176. The mounting plate 170 also is provided with ear flanges 180 (see also Figure 1) having threaded holes adapted to receive mounting bolts 182. These bolts, as shown in Figure 2, are arranged to bear against the rear surface of the panel 176 and, when pulled down tight, hold the instrument firmly in place with the side-wall flanges 178 in pressure contact with the fron tof the panel.

To prevent damage to the instrument from dirt, dust, etc., the main operating elements are enclosed within a casing 184. The front of the counter 166 also is provided with the usual cover plate 186 which is held in place by spring clips 188.

Accordingly, it will be apparent that the apparatus disclosed is well adapted to achieve the several objects set forth hereinabove, and particularly provides a flow measuring and integrating instrument that is simple in construction, accurate, and stable in operation. Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the claims.

I claim:

1. Fluid flow measuring apparatus adapted to convert a differential-pressure output signal, developed by a flow-sensing element responsive to the fluid being measured and having a magnitude proportional to the square of the fluid flow rate, to a continuous measurement signal having a magnitude directly proportional to that flow rate, comprising, in combination, an elongated rigid force bar pivoted at one end thereof, a pressure-sensitive element adapted for connection to said flow-sensing element and arranged to apply a first torque to said bar about the pivot axis thereof in accordance with the magnitude of said differential-pressure signal, a pneumatic turbine wheel supported for rotary motion and having a plurality of teeth formed on the periphery thereof, means for directing a stream of gas against the teeth of said turbine wheel to impart rotary motion thereto, a first flexure strip secured to and extending perpendicularly away from one side of said turbine wheel, a flyball assembly mounted on said first flexure strip, a counterweight secured to said turbine wheel side and positioned diametrically opposite to said flyball assembly, a second flexure strip secured to said counterweight and to said flyball assembly, said second flexure strip being positioned in a plane perpendicular to the plane of said first flexure strip to restrict said flyball assembly to pivotal motion about the effective axis of said strips in response to the centrifugal force generated by the rotation of said turbine wheel, mechanical linkage means connected between said flyball assembly and said force bar for transmitting the centrifugal force so produced to said force bar so as to apply a second torque thereto in opposition to said first torque, and pressure control means responsive to the positioning of said force bar, said control means being arranged to vary, in response to changes in the positioning of said bar, the velocity of the stream of gas fed to said turbine wheel in such a manner that the centrifugal force generated by said rotating flyball and transmitted to said bar continuously balances said bar by countering changes in torque thereon due to changes in the flow rate of said fluid, whereby the speed of said turbine wheel is substantially maintained at a value directly proportional to the flow rate of the fluid being measured.

2. Fluid flow integrating apparatus adapted to transform a differential-pressure output signal, developed by a flow-sensing element responsive to the fluid being measured and having a magnitude proportional to the square of the fluid flow rate, to a continuous measurement signal having a magnitude proportional to the total volumetric flow of said fluid over a given period of time, comprising, in combination, an elongated force bar, a pair of mutually-perpendicular cross-flexures pivotally supporting said force bar at one end thereof, a pressure-sensitive element adapted for connection to said flow-sensing element and arranged to apply a first torque to said force bar about the pivot axis thereof in accordance with the magnitude of said differential-pressure signal, a pneumatic turbine wheel supported for rotary motion and having a plurality of teeth formed on the periphery thereof, a turbine nozzle for directing a stream of gas against the teeth of said turbine wheel to impart rotary motion thereto, a flyball assembly pivotally supported by a pair of mutually-perpendicular cross-flexures to one side of said turbine wheel for generating a centrifugal force in accordance with the rotational velocity of said wheel, mechanical linkage means for transmitting the centrifugal force so produced to said force bar so as to apply a second torque thereto in opposition to said first torque, control means including a control nozzle communicating through a flow restrictor with a source of gas under pressure, means integral with the movable end of said bar and serving as a flapper to cooperate with the mouth of said control nozzle so that the control nozzle pressure is varied in accordance with the positioning of said force bar, a pneumatic relay coupled to said control nozzle to produce a high capacity pressure signal in accordance with the control nozzle pressure, means to transmit the relay pressure signal to said turbine nozzle, said control means thereby being arranged to vary, in response to changes in the positioning of said force bar, the velocity of the stream of gas fed to said turbine wheel in such a manner that the centrifugal force generated by said rotating flyball continuously balances said force bar by countering changes in torque thereon due to changes in the flow rate of said fluid, whereby the speed of said turbine wheel is substantially maintained at a value directly proportional to the flow rate of the fluid being measured, and a counter mechanism mechanically coupled to said turbine wheel to provide an indication of the total number of revolutions thereof for a given period of time.

3. A fluid flow measuring instrument adapted to convert the differential-pressure output signal developed by a square-law flow-responsive device responsive to the flow stream of the fluid being measured to a continuous measurement signal having a magnitude directly proportional to the velocity of flow of said fluid, comprising, in combination, a pivotally-supported rigid member, a pressure-sensitive element adapted to be connected to said flow-responsive device and arranged to apply a first torque to said rigid member about the pivot axis thereof in accordance with the magnitude of the differential-pressure signal produced by said device, a support member arranged for rotary motion, power drive means for imparting rotary motion to said support member, a flyball secured to and rotatably driven by said support member for producing a force in accordance with the speed of rotation thereof, transfer means for transmitting the force so produced to said rigid member so as to apply a second torque thereto in opposition to said first torque, a nozzle mounted adjacent said rigid member, a conduit connecting said nozzle to a source of gas under pressure, a flow restrictor in said conduit, means integral with said rigid member and serving as a flapper to vary the flow of gas through said nozzle in accordance with changes in the spacing between said means and the mouth of said nozzle resulting from alterations in the positioning of said rigid member, and control means responsive to changes in gas pressure in said nozzle, said control means being arranged to vary the amount of energy fed to said support member by said power means in accordance with the net torque applied to said rigid member and in such a manner that said support member is given a rotational velocity substantially proportional in magnitude to the flow rate of the fluid being measured.

4. Fluid flow integrating apparatus adapted to transform a differential-pressure flow-responsive signal developed by a square-law flow-sensing element into a continuous indication of total volumetric flow, comprising, in combination, a pivotally-supported rigid member, a pressure-sensitive element arranged for connection to the signal developed by said flow-sensing element and positioned in pressure engagement with one side of said rigid member to apply a first torque to said rigid member about the pivot axis thereof in accordance with the magnitude of said differential-pressure signal, a pneumatic turbine wheel supported on a shaft for rotary motion and having a plurality of teeth formed on the periphery thereof, a turbine nozzle fixedly mounted adjacent said turbine wheel for directing a stream of gas against the teeth of said wheel to impart rotary motion thereto, a flyball weight mechanically connected to said turbine wheel and adapted to rotate therewith to produce a centrifugal force in accordance with the rotational speed of said wheel, linkage means for transmitting the centrifugal force so produced to said rigid member in such a manner as to apply a second torque thereto in opposition to said first torque, a control nozzle mounted adjacent said rigid member, a conduit connecting said control nozzle to a source of gas pressure, a flow restrictor in said conduit, a flapper secured to said rigid member and next to the mouth of said control nozzle so that changes in positioning of said rigid member alter the flow rate of gas through said control nozzle, a pneumatic relay coupled to the interior of said control nozzle and arranged to vary the flow rate of the gas stream passing through said turbine nozzle in accordance with changes in pressure within said control nozzle, said gas stream velocity being controlled in such a manner as to maintain the speed of said turbine wheel at the correct value to produce a net torque on said rigid member of zero, and totalizing means operatively coupled to said turbine wheel to indicate the number of revolutions said wheel has rotated during a given period of time.

5. A fluid flow measuring instrument adapted to convert the non-linear differential-pressure output signal developed by a square-law flow-sensing device responsive to the flow stream of the fluid being measured to a continuous measurement signal linearly responsive to the flow rate of said fluid, comprising, in combination, a pivotally-supported rigid member, a force-producing element adapted to be coupled to said flow-sensing device, said element being in direct contact with said rigid member to apply a first torque about the pivot axis thereof in accordance with the magnitude of the differential-pressure signal produced by said device, a support member arranged for rotary motion, power drive means for transmitting energy to said support member to impart rotary motion thereto, a weight pivotally secured to and rotatably driven by said support member for producing a centrifugal force in accordance with the speed of rotation thereof, transfer means for transmitting the centrifugal force so produced to said rigid member so as to apply a second torque thereto in opposition to said first torque, said transfer means comprising an inflexible mechanical connection to assure that radial movement of said weight about the rotational axis of said support member is limited to the movement of said rigid member about its pivot axis, control means constantly responsive to the positioning of said rigid member throughout the normal range of movement thereof and adapted to produce a control signal that varies in proportion to changes in said positioning, relay means operable by said control signal to produce an output of substantial power capacity in accordance with said control signal, and means to couple the output of said relay means to said power drive means to vary the amount of energy fed to said support member in exact accordance with changes in positioning of said rigid member, whereby said support member continuously revolves at a velocity substantially linearly proportional in magnitude to the flow rate of the fluid being measured.

6. A fluid flow measuring instrument adapted to convert the non-linear differential-pressure flow signal developed by a square-law flow-sensing device responsive to the fluid stream being measured to a continuous measurement signal linearly responsive to the flow rate of said fluid, comprising, in combination, a pivotally-supported rigid member, a force-producing element adapted to be connected to said flow-sensing device and arranged to apply a first force to said rigid member to establish a first torque about the pivot axis thereof in accordance with the magnitude of the differential-pressure signal produced by said device, a wheel arranged for rotary motion, power drive means for transmitting energy to said wheel to impart rotary motion thereto, a weight connected to and rotatably driven by said wheel for producing a centrifugal force in accordance with the speed of rotation thereof, transfer means for transmitting the centrifugal force so produced to said rigid member so as to apply a second torque thereto in opposition to said first torque, a nozzle mounted adjacent said rigid member, a pipe connecting said nozzle to a source of gas under pressure, a gas flow restriction in said pipe, flapper means integral with said rigid member and movable therewith to vary the flow of gas through said nozzle in accordance with changes in the spacing between said flapper means and the mouth of said nozzle resulting from alterations in the positioning of said member, and control means responsive to changes in gas pressure in said nozzle resulting from changes in said spacing, said control means being arranged to vary the amount of energy fed to said wheel by said power drive means in accordance with the net torque applied to said rigid member and in such manner that said wheel is driven at a rotational velocity essentially linearly proportional in magnitude to the flow rate of the fluid being measured.

7. A fluid flow measuring instrument adapted to convert the differential-pressure output signal developed by a square law flow-sensing device responsive to the flow stream of the fluid being measured to a continuous measurement signal linearly responsive to the flow rate of said fluid, comprising, in combination, a pivotally-supported rigid member, a pressure-sensitive element adapted to be connected to said flow-sensing device and arranged to apply a first force to said rigid member to establish a first torque about the pivot axis thereof in accordance with the magnitude of the differential-pressure signal produced by said device, a support member arranged for rotary motion, power drive means for transmitting energy to said support member to impart rotary motion thereto, a weight pivotally secured to and rotatably driven by said support member for producing a centrifugal force in accordance with the speed of rotation thereof, transfer means for transmitting the centrifugal force so produced to said rigid member so as to apply a second torque thereto in opposition to said first torque, said transfer means including an inflexible bar integral at one end with said weight and having its other end disposed over the rotational center of said support member, a linkage member coaxial with said rotational center and extending between said other end of said bar and said rigid member to couple said centrifugal force to said member, control means constantly responsive to the positioning of said rigid member throughout the normal range of movement thereof and adapted to produce a control signal that varies with changes in said positioning, means including a source of energy and operable by changes in said control signal to produce corresponding variations in the amount of energy fed through said power drive means to said support member in exact accordance with changes in positioning of said rigid member, whereby said support member continuously revolves at a velocity essentially linearly proportional in magnitude to the flow rate of the fluid being measured.

8. A fluid flow measuring instrument adapted to convert the differential-pressure output signal developed by a square-law flow-sensing device responsive to the flow stream of the fluid being measured to a continuous measurement signal linearly responsive to the flow rate of said fluid, comprising, in combination, a pivotally-supported rigid member, a pressure-sensitive element adapted to be connected to said flow-sensing device and arranged to apply a first force to said rigid member to establish a first torque about the pivot axis thereof in accordance with the magnitude of the differential-pressure signal produced by said device, a disc arranged for rotary motion about its center axis, power drive means for transmitting energy to said disc member to impart rotary motion thereto, a weight pivotally secured to one side face of said disc and offset from said center axis for producing a centrifugal force in accordance with the speed of rotation thereof, a counterweight secured to said disc face in a position diametrically opposite to said weight, a flexure pivot mounting for said weight and including a pair of mutually-perpendicular flexure strips, one of said strips being secured to said disc face perpendicular thereto, the other of said strips extending parallel to said disc face and secured to said counterweight, linkage means secured to said weight for transmitting the centrifugal force developed thereby to said rigid member so as to apply a second torque thereto in opposition to said first torque, control means responsive to the positioning of said rigid member throughout the normal range of movement thereof and adapted to produce a control signal that varies with changes in said positioning, and means operable in response to changes in said control signal to vary the amount of energy fed by said power drive means to said disc in exact accordance with changes in positioning of said rigid member, whereby said disc continuously revolves at a velocity substantially linearly proportional in magnitude to the flow rate of the fluid being measured.

9. A fluid flow measuring instrument adapted to convert the non-linear differential-pressure flow signal developed by a square-law flow-sensing device responsive to the fluid stream being measured to a continuous measurement signal linearly responsive to the flow rate of said fluid, comprising, in combination, a movably-supported rigid member, a force-producing element adapted to be connected to said flow-sensing device and arranged to apply a first force to said rigid member in a first direction in accordance with the magnitude of the differential-pressure signal produced by said device, a support member arranged for rotary motion, power drive means for transmitting energy to said support member to impart rotary motion thereto, a weight connected to and rotatably driven by said support member for producing a centrifugal force in accordance with the speed of rotation thereof, transfer means for transmitting the centrifugal force so produced in said rigid member so as to apply a second force thereto in a second direction in opposition to said first force, control means constantly responsive to the positioning of said rigid member throughout the normal range of movement thereof and adapted to produce a control signal that varies in proportion to changes in said positioning, relay means including a source of energy and operable in response to changes in said control signal to produce corresponding changes in output of substantial power capacity relative to said control signal, and means to couple the output of said relay means to said power drive means to substantially vary the amount of energy fed to said support member in exact accordance with slight changes in positioning of said rigid member, whereby said support member continuously revolves at a velocity essentially linearly proportional in magnitude to the flow rate of the fluid being measured.

10. A measuring instrument as claimed in claim 9, wherein said support member comprises a disc mounted for rotation about its axis, and a flexible strip secured to said disc and said weight to provide a friction-free pivot mounting for said weight, said flexible strip being arranged to permit movement of said weight radially with respect to said disc.

11. A measuring instrument as claimed in claim 10, wherein said flexible strip is secured to one side face of said disc and positioned to extend away therefrom in a direction parallel to the axis of said disc, a second flexible strip secured to said weight and extending radially away therefrom towards the axis of said disc, and means for fastening said second strip to said disc, said second strip cooperating with the first strip to establish a pivot axis for said weight that is spaced away from said one side face of said disc.

12. A measuring instrument as claimed in claim 11, wherein said second flexible strip extends in a direction that is parallel to the effective plane of said one side face of said disc, said second strip extending over the center of said disc to a region diametrically opposite to the region of said weight, said transfer means comprising a rigid linkage element integrally secured to said weight and extending radially in to a point over the center of said disc, and a pin mounted coaxially with said disc and extending between said rigid member and said rigid linkage element to transmit the centrifugal force from said weight to said rigid member.

References Cited in the file of this patent

UNITED STATES PATENTS

| | | |
|---|---|---|
| 392,617 | Lieb et al. | Nov. 13, 1888 |
| 1,993,527 | Mears et al. | Mar. 5, 1935 |
| 1,993,707 | Rosecrans | Mar. 5, 1935 |
| 2,094,196 | Town | Sept. 28, 1937 |
| 2,107,976 | Blasig | Feb. 8, 1938 |
| 2,487,679 | Stover | Nov. 8, 1949 |
| 2,509,685 | Hughes | May 30, 1950 |
| 2,535,202 | Gregory et al. | Dec. 26, 1950 |
| 2,575,304 | Stover | Nov. 13, 1951 |
| 2,699,066 | Russell | Jan. 11, 1955 |

FOREIGN PATENTS

| | | |
|---|---|---|
| 1,068,500 | France | Feb. 3, 1954 |